US012607997B2

(12) United States Patent
Quin et al.

(10) Patent No.: US 12,607,997 B2
(45) Date of Patent: Apr. 21, 2026

(54) MOBILE PLATFORM SYSTEMS AND METHODS USING MESH NETWORKS

(71) Applicant: FLIR Unmanned Aerial Systems ULC, Vancouver (CA)

(72) Inventors: Spencer Quin, Kitchener (CA); Sergey Kolomiets, Waterloo (CA); Richard Cunha, Toronto (CA); Marco P. Pedrosa, Waterloo (CA); Scott Sweezey, Waterloo (CA)

(73) Assignee: FLIR Unmanned Aerial Systems ULC, Vancouver (CA)

(*) Notice: Subject to any disclaimer, the term of this patent is extended or adjusted under 35 U.S.C. 154(b) by 105 days.

(21) Appl. No.: 17/721,894

(22) Filed: Apr. 15, 2022

(65) Prior Publication Data

US 2022/0350328 A1 Nov. 3, 2022

Related U.S. Application Data

(60) Provisional application No. 63/181,113, filed on Apr. 28, 2021.

(51) Int. Cl.
*G05D 1/00* (2024.01)
*B64U 101/30* (2023.01)
(Continued)

(52) U.S. Cl.
CPC ............ *G05D 1/0022* (2013.01); *G01S 19/01* (2013.01); *G05D 1/101* (2013.01); *G08G 5/55* (2025.01);
(Continued)

(58) Field of Classification Search
CPC .... G05D 1/101; G05D 1/0022; H04N 23/695; H04N 23/661; B64D 47/08;
(Continued)

(56) References Cited

U.S. PATENT DOCUMENTS

| | | | |
|---|---|---|---|
| 11,492,113 B1* | 11/2022 | Kipurs | .................. G05D 1/106 |
| 2007/0131822 A1* | 6/2007 | Stallard | .................. G05D 1/104 |
| | | | 244/190 |

(Continued)

FOREIGN PATENT DOCUMENTS

WO WO 2019-212675 A1 11/2019

*Primary Examiner* — Anne Marie Antonucci
*Assistant Examiner* — Jared C Bean
(74) *Attorney, Agent, or Firm* — Haynes and Boone, LLP

(57) ABSTRACT

Systems and methods related to operating a mobile platform using mesh networks are disclosed. In one embodiment, a control station may have a user interface that displays nodes participating in a mesh network. The control station may provide the positions of the nodes using position information broadcasted from the nodes and received by the control station. A user may select a node in the user interface and enter a command to have a mobile platform interact with the node. The control station may send the command to the mobile platform and cause the mobile platform to establish a wireless connection to the node, subscribe to position information corresponding to the node and received from the node by the wireless connection, and operate the mobile platform in response to the position information of the selected node, such as by following the node, image tracking the node, or landing near the node.

20 Claims, 8 Drawing Sheets

(51) Int. Cl.

| | |
|---|---|
| *G01S 19/01* | (2010.01) |
| *G08G 5/55* | (2025.01) |
| *G08G 5/57* | (2025.01) |
| *H04N 23/661* | (2023.01) |
| *H04N 23/695* | (2023.01) |

(52) U.S. Cl.
CPC ............. *G08G 5/57* (2025.01); *H04N 23/661* (2023.01); *H04N 23/695* (2023.01); *B64U 2101/30* (2023.01); *B64U 2201/20* (2023.01)

(58) Field of Classification Search
CPC ........................... G08G 5/0069; B64C 39/024; H04B 7/18504; G01S 19/01; B64U 2201/20; B64U 2101/30
See application file for complete search history.

(56) References Cited

U.S. PATENT DOCUMENTS

| | | | |
|---|---|---|---|
| 2016/0031559 A1* | 2/2016 | Zang .................... | G05D 1/0011 701/2 |
| 2016/0033966 A1* | 2/2016 | Farris .................... | G01C 21/20 701/16 |
| 2018/0194466 A1* | 7/2018 | Zhao .................... | G05D 1/0676 |
| 2019/0174149 A1* | 6/2019 | Zhang ................ | H04N 21/4728 |
| 2019/0349529 A1* | 11/2019 | Achtelik ................ | B64U 10/13 |
| 2020/0104598 A1* | 4/2020 | Qian ........................ | G06V 20/20 |
| 2021/0058143 A1* | 2/2021 | Muren ................. | H04W 16/18 |
| 2021/0129982 A1* | 5/2021 | Collins ................. | B64U 10/60 |
| 2021/0166571 A1* | 6/2021 | Zhu .......................... | G08G 5/55 |
| 2021/0399791 A1* | 12/2021 | Byrne ................... | H04W 16/26 |

* cited by examiner

100

110 →

Mobile
Platform

306a
Position
Information

Node 302a

300

Node 302b

306a
Position
Information

308
Command

306b
Position
Information

306c
Position
Information

Node 302c

Control Station 130

User 304

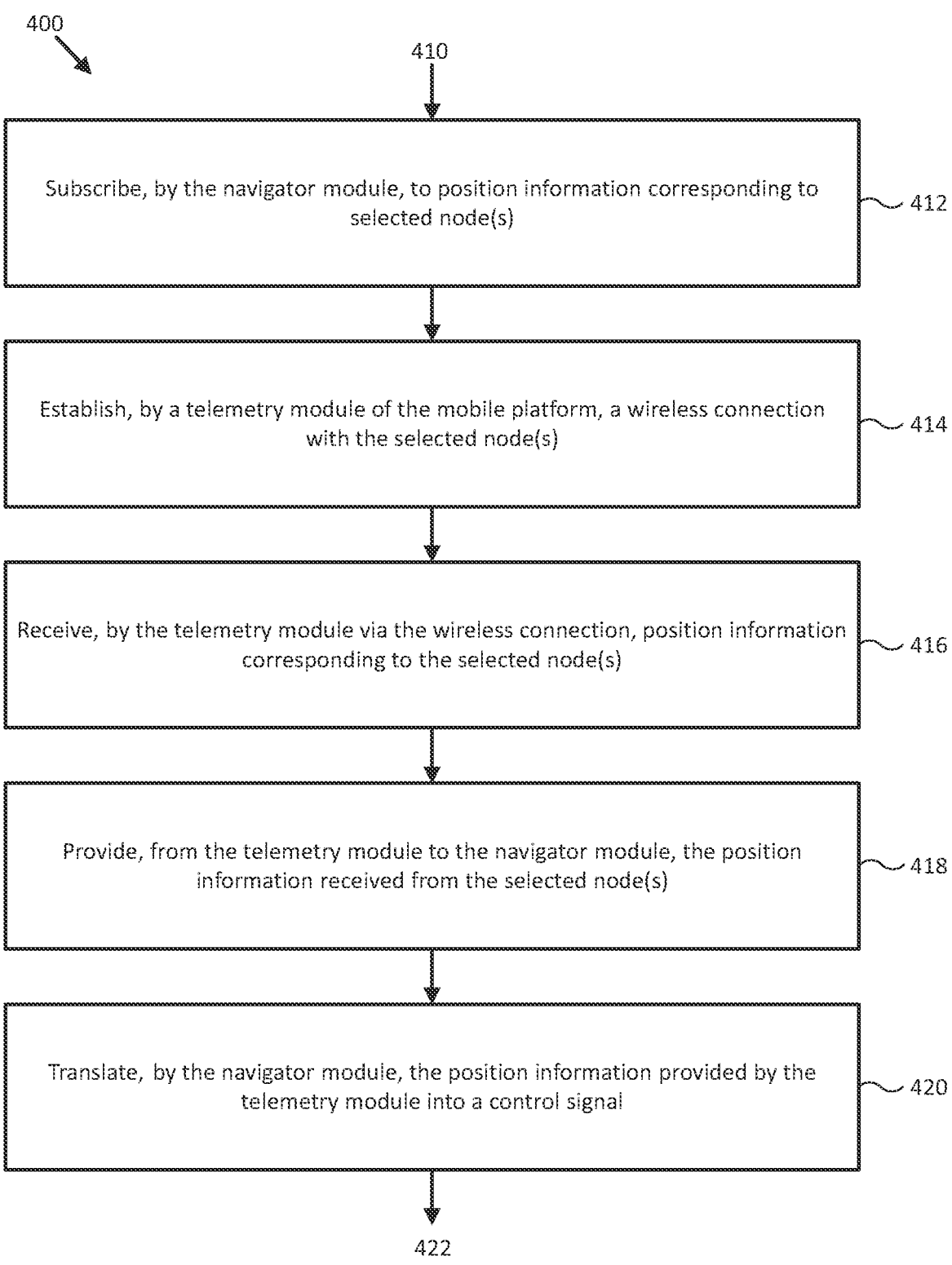

400

410

Subscribe, by the navigator module, to position information corresponding to selected node(s) — 412

Establish, by a telemetry module of the mobile platform, a wireless connection with the selected node(s) — 414

Receive, by the telemetry module via the wireless connection, position information corresponding to the selected node(s) — 416

Provide, from the telemetry module to the navigator module, the position information received from the selected node(s) — 418

Translate, by the navigator module, the position information provided by the telemetry module into a control signal — 420

MOBILE PLATFORM SYSTEMS AND METHODS USING MESH NETWORKS

CROSS REFERENCE TO RELATED APPLICATIONS

This application claims priority to and the benefit of U.S. Provisional Patent Application No. 63/181,113 filed Apr. 28, 2021 and entitled "MOBILE PLATFORM SYSTEMS AND METHODS USING MESH NETWORKS," which is hereby incorporated by reference in its entirety.

TECHNICAL FIELD

One or more embodiments relate generally to mobile platforms and more particularly, for example, to mobile platform systems and methods using mesh networks.

BACKGROUND

Modern unmanned mobile sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. In particular, UAVs have a wide range of real-world applications including surveillance, reconnaissance, exploration, item transportation, disaster relief, aerial photography, large-scale agriculture monitoring, etc. A UAV may generally be equipped with various devices such as sensors and navigation technologies to complete a broad variety of operations in the real-world applications. However, oftentimes such sensors and navigation technologies may not be sufficient for the UAV to complete such operations. Thus, there is a need in the art to improve a UAV's ability to complete operations by utilizing the capability of a mesh network to exchange information between neighboring nodes.

SUMMARY

Various systems and methods related to operating a mobile platform using mesh networks are disclosed. A control station is provided in one embodiment of the disclosure. The control station may include a communication system, a user interface, and a logic circuit. The communication system may be configured to pass wireless signals between the control station and a mesh network comprising a plurality of nodes. The user interface may be configured to display the nodes using position information received from the nodes. The logic circuit may be configured to receive, via the communication system, the position information corresponding to the nodes and present the nodes in the user interface based on the position information. The logic circuit may further receive a user selection of a node from the nodes displayed in the user interface and a command identifying the selected node. The logic circuit may send to a mobile platform, by the communication system, the command identifying the selected node. The command may cause the mobile platform to establish a wireless connection to the selected node and subscribe to position information corresponding to the selected node, wherein the position information may be received from the selected node by the wireless connection. The command may further cause the mobile platform to operate one or more elements of the mobile platform (e.g., a propulsion system and/or imaging system 140) of the mobile platform in response to the position information of the selected node and in accordance with the command.

As an example, the command may be a navigation command instructing the mobile platform to follow the selected node, by an offset distance, using position information corresponding to the selected node. In another example, the command may be an image tracking command instructing the mobile platform to capture image frames of the selected node. The position information received by the mobile platform from the selected node can be used by the mobile platform to adjust a position/orientation of the mobile platform and/or an imaging system of the mobile platform so that the image frames of the selected node can be captured. In an additional example, the command may be a landing command instructing the mobile platform to land at a landing location associated with the selected node.

A mobile platform is provided in another embodiment of the disclosure. The mobile platform may include a propulsion system, a communication system, a navigator module, a telemetry module, and a controller. The propulsion system may be configured to provide motive force for the mobile platform. The communication system may be configured to pass wireless signals between the mobile platform and a mesh network comprising a plurality of nodes. The navigator module may be configured to receive, from a control station of the mesh network and by the communication system, a command identifying a selected node from the plurality of nodes of the mesh network. The navigator module may further be configured to subscribe to position information corresponding to the selected node. The telemetry module may be configured to establish a wireless connection between the communication system of the mobile platform and the selected node in response to the command and subscription by the navigator module. The position information may be received from the selected node by the wireless connection and provided to the navigator module by the telemetry module. The controller may be configured to operate one or more elements of the mobile platform (e.g., a propulsion system and/or an imaging system) in response to the position information (e.g., a control signal generated and provided by the navigator module based on the position information).

The scope of the invention is defined by the claims, which are incorporated into this section by reference. A more complete understanding of further embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-4C illustrate a flow diagram of a process for operating a mobile platform in accordance with one or more embodiments of the disclosure.

Figure 1:
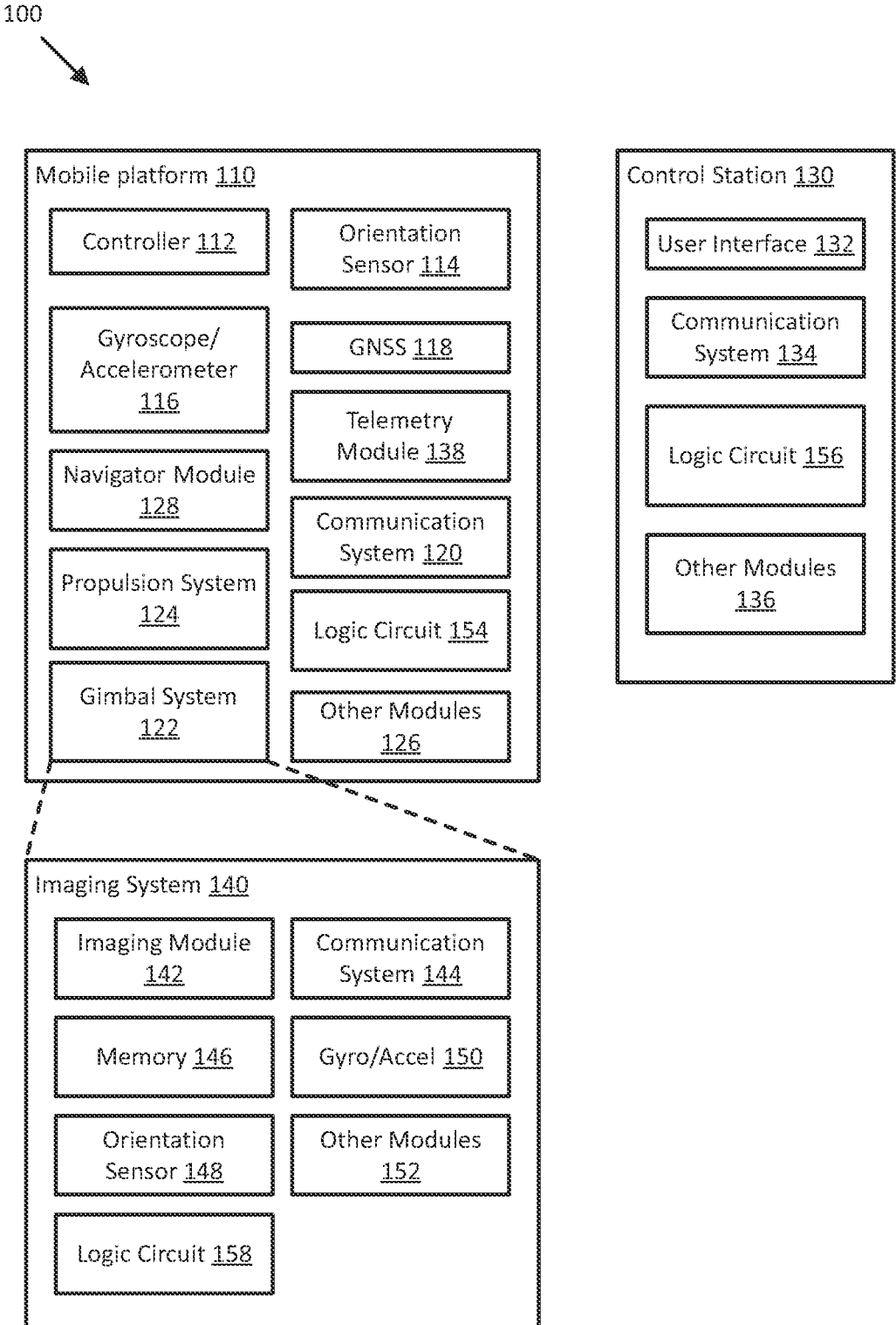
FIG. 1 illustrates a diagram of a survey system in accordance with one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Mobile platforms (e.g., UAVs, ROVs, USVs, and UGVs) participate in a number of different types of missions. In some missions, a mobile platform may be required to engage with a moving target (e.g., a radio device, radio marker). For example, in a mission, a user (e.g., a human piloting the UAV from a remote location using a control station) may want to have the mobile platform follow the target at a fixed distance (e.g., an offset distance). As another example, in a mission, the user may want to have several mobile platforms controllable from the control station follow different targets. In another example, in a mission, the user may want to have several vehicles follow a single target or have the several vehicles follow each other in a daisy chain manner. The present disclosure provides systems, devices, and methods to facilitate operation of a mobile platform to complete the aforementioned missions as well as complete additional tasks that will be apparent in view of the disclosure. For example, by implementing embodiments of the present disclosure, position information corresponding to targets, which may be nodes participating in a mesh network, can be ingested and displayed in a user interface of a control station such that the user can track the positions of the nodes and command the mobile platform to interact with the nodes as desired.

In some embodiments, a mesh network may be a group of devices arranged in a single network so that there are multiple sources to route and retrieve information among the devices. The devices may be referred to as nodes in certain embodiments. In some cases, a node may be a mobile platform, a vehicle (e.g., an autonomous, semi-autonomous, or traditional vehicle), a base station (e.g., a set home location for a mobile platform), a radio device held by a human or structure, a control station, and so forth. The nodes may communicate with each other in various ways. For example, a Cursor-on-Target protocol may be used as a communication standard to share information amongst the nodes in some embodiments. The Cursor-on-Target protocol may allow nodes to send and receive information that identifies the sending node, a position of the sending node, and when the position was determined by the sending node (e.g., using telemetry of the sending node). In one case, position information may include GPS coordinate position information determined by the sending node.

Some embodiments of the disclosure provide a control station. The control station may have a user interface that displays nodes participating in a mesh network. The control station may provide the positions of the nodes using position information broadcasted from the nodes and received by the control station. A user may select a node in the user interface and enter a command to have a mobile platform interact with the selected node. The control station may send the command to the mobile platform and cause the mobile platform to operate in accordance with the command.

The mobile platform may operate in accordance with the command received from the control station. For example, a navigator module of the mobile platform may receive, from the control station and by a communication system of the mobile platform, the command identifying a selected node from the plurality of nodes of the mesh network. In response to the command, the navigator module may subscribe to position information corresponding to the selected node. A telemetry module of the mobile platform may establish a wireless connection between the communication system of the mobile platform and the selected node in response to the command and the subscription by the navigator module. The wireless connection may allow the mobile platform to act autonomously in accordance with the command even in an event where the control station and the mobile platform disconnect. Further, the wireless connection may reduce signal latency since telemetry information from the selected node can be received directly rather than through the control station.

The position information corresponding to the selected node may be received from the selected node by the communication system, via the wireless connection, and provided to the navigator module by the telemetry module. The navigator module may then provide a control signal to a controller of the mobile platform to operate one or more elements of the mobile platform (e.g., a propulsion system and/or an imaging system) in response to the position information and in accordance with the command from the control station (e.g., a control signal generated and provided by the navigator module based on the position information). The control signal may be continuously adjusted as needed based on updates received related to the position of the selected node.

In some embodiments, the command may be a navigation command instructing the mobile platform to follow the selected node, by an offset distance, using position information corresponding to the selected node. In various embodiments, the command may be an image tracking command instructing the mobile platform to capture image frames of the selected node. The position information received by the mobile platform from the selected node can be used by the mobile platform to adjust a position/orientation of the mobile platform and/or an imaging system of the mobile platform so that the image frames of the selected node can be captured. In a further embodiment, the command may be a landing command instructing the mobile platform to land at a landing location associated with the selected node.

In some cases, more than one command can be sent to the mobile platform as a command package and the mobile platform may complete the commands in a sequence delineated in the command package. In some cases, one or more commands in the command package may be completed simultaneously. For example, the mobile platform may be commanded to complete one or more of the following simultaneously: follow a first node, image track a second node, and land at a landing location associated with a third node.

Furthermore, in some embodiments, commands can be dynamically swapped. For example, a first command may be sent to the mobile platform to have the mobile platform follow a first node such as a second mobile platform. A second command may then be sent to the mobile platform to have the mobile platform switch to following a second node such as a third mobile platform.

Now referring to FIG. 1, illustrated is a block diagram of a survey system 100 including a mobile platform 110 and a control station 130, in accordance with an embodiment of the disclosure. In various embodiments, mobile platform 110 may be configured to fly over a scene or survey area, to fly through a structure, or to approach a target and image or sense the scene, structure, or target, or portions thereof, using gimbal system 122 to aim imaging system/sensor payload 140 at the scene, structure, or target, or portions thereof, for example. Resulting imagery and/or other sensor data may be processed (e.g., by logic circuit 158, logic circuit 154, and/or logic circuit 156) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of mobile platform 110 and/or imaging system 140, such as controlling gimbal system 122 to aim imaging system 140 towards a particular direction, or controlling propulsion system 124 to move mobile platform 110 to a desired position in a scene or structure or relative to a target.

In the embodiment shown in FIG. 1, survey system 100 includes mobile platform 110, control station 130, and at least one imaging system 140. Mobile platform 110 may be implemented as a mobile platform configured to move or fly and position and/or aim imaging system 140 (e.g., relative to a selected, designated, or detected target). As shown in FIG. 1, mobile platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of mobile platform 110 may be substantially autonomous and/or partially or completely controlled by control station 130, which may include one or more of a user interface 132, a communication system 134, a logic circuit 156 and other modules 136. In other embodiments, mobile platform 110 may include one or more of the elements of control station 130, such as with various types of manned aircraft, terrestrial vehicles, and/or surface or subsurface watercraft. Imaging system 140 may be physically coupled to mobile platform 110 and be configured to capture sensor data (e.g., visible spectrum images, infrared images, narrow aperture radar data, and/or other sensor data) of a target position, area, and/or object(s) as selected and/or framed by operation of mobile platform 110 and/or control station 130. In various embodiments, the imaging system 140 may be oriented to capture a node participating in a mesh network based on position information received by the mobile platform 110 from the node. In some embodiments, one or more of the elements of system 100 may be implemented in a combined housing or structure that can be coupled to or within mobile platform 110 and/or held or carried by a user of system 100.

Logic circuit 154 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile platform 110 and/or other elements of system 100, such as the gimbal system 122, imaging system 140, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by logic circuit 154. In these and other embodiments, logic circuit 154 may be implemented with other components where appropriate, such as volatile memory, non-volatile memory, one or more interfaces, and/or various analog and/or digital components for interfacing with devices of system 100. For example, logic circuit 154 may be adapted to store sensor signals, sensor information, parameters for coordinate frame transformations, calibration parameters, sets of calibration points, and/or other operational parameters, over time, for example, and provide such stored data to a user using user interface 132. In some embodiments, logic circuit 154 may be integrated with one or more other elements of mobile platform 110 such as controller 112, navigator module 128, and/or telemetry module 138, for example. In some embodiments, the logic circuit 154 may be distributed as multiple logic devices within mobile platform 110, control station 130 (e.g., logic circuit 156), and/or imaging system 140 (e.g., logic circuit 158).

In some embodiments, logic circuit 154 may be configured to substantially continuously monitor and/or store the status of and/or sensor data provided by one or more elements of mobile platform 110, imaging system 140, and/or control station 130, such as the position and/or orientation of mobile platform 110, imaging system 140, and/or control station 130, for example. As another example, the logic circuit 154 may be configured continuously monitor and/or store the status of data provided by navigator module 128 and/or telemetry module 138. It will be appreciated that logic circuits 158 and 156 may be implemented with hardware and/or software components similar to logic circuit 154.

Orientation sensor 114 may be implemented as one or more of a compass, float, accelerometer, and/or other device capable of measuring an orientation of mobile platform 110 (e.g., magnitude and direction of roll, pitch, and/or yaw, relative to one or more reference orientations such as gravity and/or Magnetic North), gimbal system 122, imaging system 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile platform 110 and/or other elements of system 100 and providing such measurements as sensor signals and/or data that may be communicated to other devices of system 100 (e.g., user interface 132, logic circuit 154). GNSS 118 may be implemented according to any global navigation satellite system, including a GPS, GLO-NASS, and/or Galileo based receiver and/or other device capable of determining absolute and/or relative position of mobile platform 110 (e.g., or an element of mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communications system configured to transmit and receive analog and/or digital signals between elements of system 100 and other nodes participating in a mesh network. For example, communication system 120 may be configured to receive flight control signals and/or data (e.g., commands to interact with selected nodes in the mesh network) from control station 130 and provide them to navigator module 128, logic circuit 154, and/or propulsion system 124. In other embodiments, communication system 120 may be configured to receive images and/or other sensor information (e.g., visible spectrum and/or infrared still images or video images) from imaging system 140 and relay the sensor data to logic circuit 154 and/or control station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein. In some embodiments, telemetry module 138 may interface with the communication system 120 to establish a wireless connection/communication link with one or more nodes selected from a plurality of nodes participating in a mesh network. The selected nodes may transmit telemetry data (e.g., position information) to the telemetry module 138 via the established wireless connection and the communication system 120. In various embodiments, navigator module 128 may interface with the communication system 120 to communicate with the control station 130. For example, the navigator module 128 may receive, from the control station via the communication system 120, commands and node selections, which may be used to operate the mobile platform 110 to interact with the selected nodes in accordance with the commands.

Gimbal system 122 may be implemented as an actuated gimbal mount, for example, that may be controlled by controller 112 and/or logic circuit 154 to stabilize imaging system 140 relative to a target or to aim imaging system 140 according to a desired direction and/or relative orientation or position. For example, controller 112 may receive a control signal from one or more components of system 100 to cause gimbal system 122 to adjust a position of imaging system 140 as described in the disclosure. As such, gimbal system 122 may be configured to provide a relative orientation of imaging system 140 (e.g., relative to an orientation of mobile platform 110) to controller 112, logic circuit 154, and/or communication system 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/imaging system 140. In further embodiments, gimbal system 122 may be configured to couple to a laser pointer, range finder, and/or other device, for example, to support, stabilize, power, and/or aim multiple devices (e.g., imaging system 140 and one or more other devices) substantially simultaneously.

In some embodiments, gimbal system 122 may be adapted to rotate imaging system 140+−90 degrees, or up to 360 degrees, in a vertical plane relative to an orientation and/or position of mobile platform 110. In further embodiments, gimbal system 122 may rotate imaging system 140 to be parallel to a longitudinal axis or a lateral axis of mobile platform 110 as mobile platform 110 yaws, which may provide 360 degree ranging and/or imaging in a horizontal plane relative to mobile platform 110. In various embodiments, logic circuit 154 may be configured to monitor an orientation of gimbal system 122 and/or imaging system 140 relative to mobile platform 110, for example, or an absolute or relative orientation of an element of imaging system 140 (e.g., SER 145). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to mobile platform 110 and/or to steer mobile platform 110. In some embodiments, propulsion system 124 may include multiple propellers (e.g., a tri, quad, hex, oct, or other type "copter") that can be controlled (e.g., by controller 112) to provide lift and motion for mobile platform 110 and to provide an orientation for mobile platform 110. In other embodiments, propulsion system 124 may be configured primarily to provide thrust while other structures of mobile platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions (e.g., control signals), such as software instructions implementing a control loop for controlling various operations of mobile platform 110 and/or other elements of system 100, such as gimbal system 122, imaging system 140, and propulsion system 124. For example, the controller 112 may receive a control signal from navigator module 128 to operate the propulsion system 124 in accordance with commands received from the control station 130. The control signal may be generated by the navigator module 128 based on position information corresponding to a node and received by the mobile platform 110 from the node (e.g., via the communication system 120). The control signal may be generated in accordance with a command received from the control station 130 to interact with the node (e.g., follow the node, track the node with the imaging system, and/or land at a designated location in proximity to the node) and may be adjusted based on position information received from the node by the telemetry module 138 and provided to the navigator module 128. In some embodiments, the controller 112, the navigator module 128, and/or the telemetry module 128 may be components of the logic circuit 154.

Other modules 126 may include other and/or additional sensors, actuators, communications modules/nodes, and/or user interface devices, for example, and may be used to provide additional environmental information related to operation of mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of mobile platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to mobile platform 110, where each actuated device includes one or more actuators adapted to adjust an orientation of the device, relative to mobile platform 110, in response to one or more control signals (e.g., provided by controller 112 or logic circuit 154). In particular, other modules 126 may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 and/or monitor communication link quality with the control station 130 or other nodes in the mesh network.

User interface 132 of control station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of control station 130) to other devices of system 100, such as logic circuit 154. User interface 132 may also be implemented with one or more logic devices (e.g., similar to logic circuit 154) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of mobile platform 110 and/or other nodes participating in a mesh network. For example, user interface 132 may be adapted to display a time series of positions, headings, and/or orientations of mobile platform 110 and/or other nodes overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause mobile platform 110 to move according to the target heading, route, and/or orientation, or to aim imaging system 140 accordingly. In other embodiments, user interface 132 may be adapted to accept user input modifying a control loop parameter of logic circuit 154, for example. In further embodiments, user interface 132 may be adapted to accept user input including a user-defined target attitude, orientation, and/or position for an actuated or articulated device (e.g., imaging system 140) associated with mobile platform 110, for example, and to generate control signals for adjusting an orientation and/or position of the actuated device according to the target altitude, orientation, and/or position. Such control signals may be transmitted to logic circuit 154 (e.g., using communication system 134 and 120), which may then control mobile platform 110 accordingly.

Communication system 134 may be implemented as any wired and/or wireless communications system configured to transmit and receive analog and/or digital signals between elements of system 100 and/or nodes participating in a mesh network. For example, communication system 134 may be configured to transmit flight control signals or commands from user interface 132 to communications systems 120 or 144. In other embodiments, communication system 134 may be configured to receive sensor data (e.g., visible spectrum and/or infrared still images or video images, or other sensor data) from imaging system 140. In some embodiments, communication system 134 may be configured to support spread spectrum transmissions, for example, and/or multiple simultaneous communications channels between elements of system 100. In various embodiments, communication system 134 may be configured to monitor the status of a communication link established between control station 130, imaging system 140, mobile platform 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Logic circuit 156 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of control station 130. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various elements of system 100).

Other modules 136 of control station 130 may include other and/or additional sensors, actuators, communications modules/nodes, and/or user interface devices used to provide additional environmental information associated with control station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., logic circuit 156) to provide operational control of mobile platform 110 and/or system 100 or to process sensor data to compensate for environmental conditions, such as an water content in the atmosphere approximately at the same altitude and/or within the same area as mobile platform 110 and/or control station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

Logic circuit 158 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of imaging system 140. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various elements of system 100).

In embodiments where imaging system 140 is implemented as an imaging device, imaging system 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to logic circuit 154) that can be configured to process imagery captured by detector elements of imaging module 142 before providing the imagery to memory 146 or communications module 144. More generally, imaging module 142 may be configured to perform any of the operations or methods described herein, at least in part, or in combination with logic circuit 154 and/or user interface 132. In some embodiments, the imaging module 142 may be a component of the logic circuit 158.

In some embodiments, imaging system 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communication system 144 of imaging system 140 may be implemented as any wired and/or wireless communications module configured to transmit and receive analog and/or digital signals between elements of system 100. For example, communication system 144 may be configured to transmit infrared images from imaging module 142 to communications systems 120 or 134. In other embodiments, communication system 144 may be configured to receive control signals (e.g., control signals directing capture, focus, selective filtering, and/or other operation of imaging system 140) from logic circuit 154 and/or user interface 132. In some embodiments, communication system 144 may be configured to support spread spectrum transmissions, for example, and/or multiple simultaneous communications channels between elements of system 100. In various embodiments, communication system 144 may be configured to monitor and communicate the status of an orientation of the imaging system 140. Such status information may be used, for example, to adjust the orientation of the imaging system 140 to capture images of a node in a mesh network.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of imaging system 140 may be implemented similar to orientation sensor 114 or gyroscope/accelerometer 116, and/or any other device capable of measuring an orientation of imaging system 140, imaging module 142, and/or other elements of imaging system 140 (e.g., magnitude and direction of roll, pitch, and/or yaw, relative to one or more reference orientations such as gravity, Magnetic North, and/or an orientation of mobile platform 110) and providing such measurements as sensor signals that may be communicated to various devices of system 100. Gyroscope/accelerometer (e.g., angular motion sensor) 150 of imaging system 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of imaging system 140 and/or various elements of imaging system 140 and providing such measurements as sensor signals that may be communicated to various devices of system 100.

Other modules 152 of imaging system 140 may include other and/or additional sensors, actuators, communications modules/nodes, cooled or uncooled optical filters, and/or user interface devices used to provide additional environmental information associated with imaging system 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., logic circuit 154 or controller 112) to provide operational control of mobile platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor). According to some embodiments, one or more devices of the system 100 may be implemented in logic circuit 154. For example, controller 112, telemetry module 138, navigator module 128, communication system 120, and/or other devices of system 100 may be implemented in logic circuit 154.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for mobile platform 110, using one or more power leads. Such power leads may also be used to support one or more communication techniques between elements of system 100.

Figure 2:
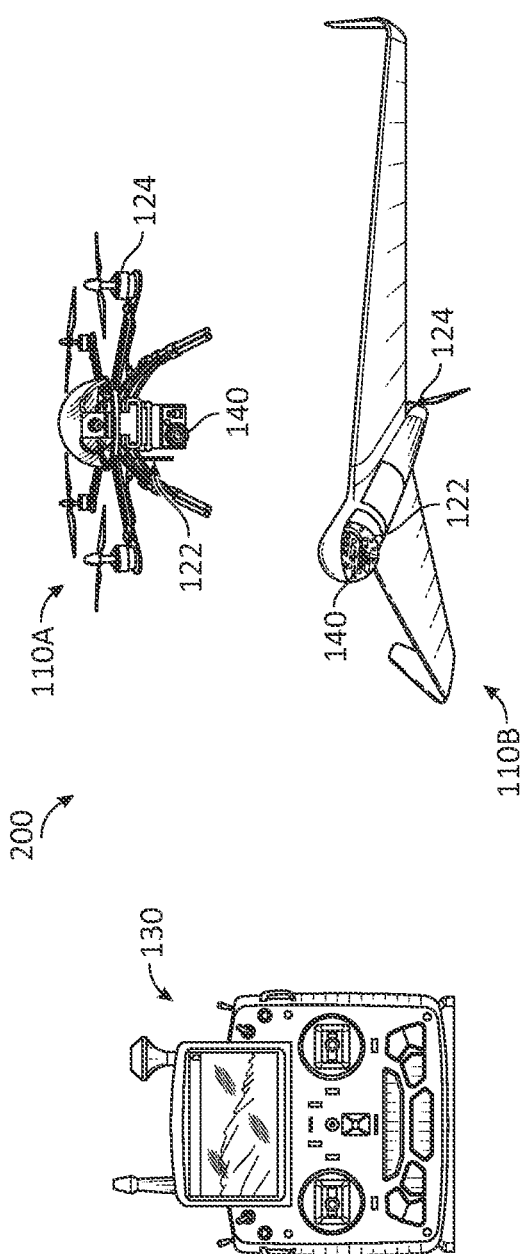
FIG. 2 illustrates a diagram of a survey system including mobile platforms in accordance with one or more embodiments of the disclosure.
Figure 2:

FIG. 2 illustrates a diagram of survey system 200 including mobile platforms 110A and 110B, each with imaging systems 140 and associated gimbal systems 122 in accordance with an embodiment of the disclosure. In the embodiment shown in FIG. 2, survey system 200 includes control station 130, mobile platform 110A with articulated imaging system 140 and gimbal system 122, and mobile platform 110B with articulated imaging system 140 and gimbal system 122, where control station 130 may be configured to control motion, position, and/or orientation of mobile platform 110A, mobile platform 110B, and/or imaging systems 140. More generally, survey system 200 may include any number of mobile platforms 110, 110A, and/or 110B. In some embodiments, control station 130 and mobile platforms 110, 110A, and/or 110B may be nodes participating in a mesh network, in some cases along with additional nodes of the mesh network. The nodes of the mesh network may exchange information about their respective positions with neighboring nodes. In some embodiments, the nodes may exchange information about their respective positions with neighboring nodes in accordance with a Cursor-on-Target (CoT) communication protocol. In further embodiments, the position information shared between nodes may include GPS coordinate positions for the respective nodes.

Figure 3A:
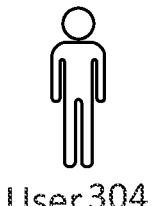
FIG. 3A illustrates a mesh network in accordance with one or more embodiments of the disclosure.

FIG. 3A illustrates a mesh network 300 in accordance with one or more embodiments of the disclosure. The mesh network 300 may have a plurality of participating nodes. For example, node 302a, node 302b, node 302c, mobile platform 110, and/or control station 130 may be participating in the mesh network 300. Nodes 302a-c may include various devices (e.g., similar to communication system 120) configured transmit signals to and from other nodes in the mesh network including the control station 130. As an example, nodes 302a-c may be radio devices, mobile platforms, vehicles, base stations, and/or mobile devices.

In the mesh network 300, node 302a, 302b, node 302c, and mobile platform 110 may broadcast position information, which may be received by control station 130 (e.g., via communication system 134). As shown in FIG. 3A, position information 306a may be sent from node 302a to control station 130, position information 306b may be sent from node 302b to control station 130, and position information 306c may be send from node 302c to control station 130. In some embodiments, the position information may be relayed to control station 130 using a flooding technique in which every incoming data packet at a node containing position information is sent through every outgoing link of the node except the one that it arrived on. In other embodiments, the position information may be propagated using a routing technique in which position information is propagated along a path by hopping from node to node until it reaches control station 130.

In some embodiments, the position information sent by the nodes 302a-c may be telemetry data that is generated at each respective node and provided to other nodes in the mesh network (e.g., nodes 302a-c) and/or the control station 130 for various purposes. In one embodiment, the control station 130 may provide a user interface for a user 304 to send a command 308 to mobile platform 110. For example, the control station 130 may provide a representation of the nodes 302a-c in the user interface based on the position information 306a-c received from the nodes 302a-c. The user interface may allow the user to view the nodes 302a-c and their respective positions in relation to a position of mobile platform 110. Control station 130 may receive a selection of one or more nodes of nodes 302a-c and command 308 that the user wants the mobile platform 110 to execute upon the selected node(s). For example, user 304 may enter a command to follow node 302a, image track node 302a, and/or land at a landing location associated with node 302a. Control station 308 may send, to mobile platform 110, command 308 including information about node 302a that would facilitate execution of command 308. For example, the information may identify node 302a and provide any data required for mobile platform 110 to establish a direct wireless connection with node 302a.

In some embodiments, mobile platform 110 may perform various operations in response to receiving command 308 and information about selected node 302a from control station 130, including receiving position information 306a through a direct wireless connection with node 302a as further discussed below in reference to FIG. 3B.

Figure 3B:
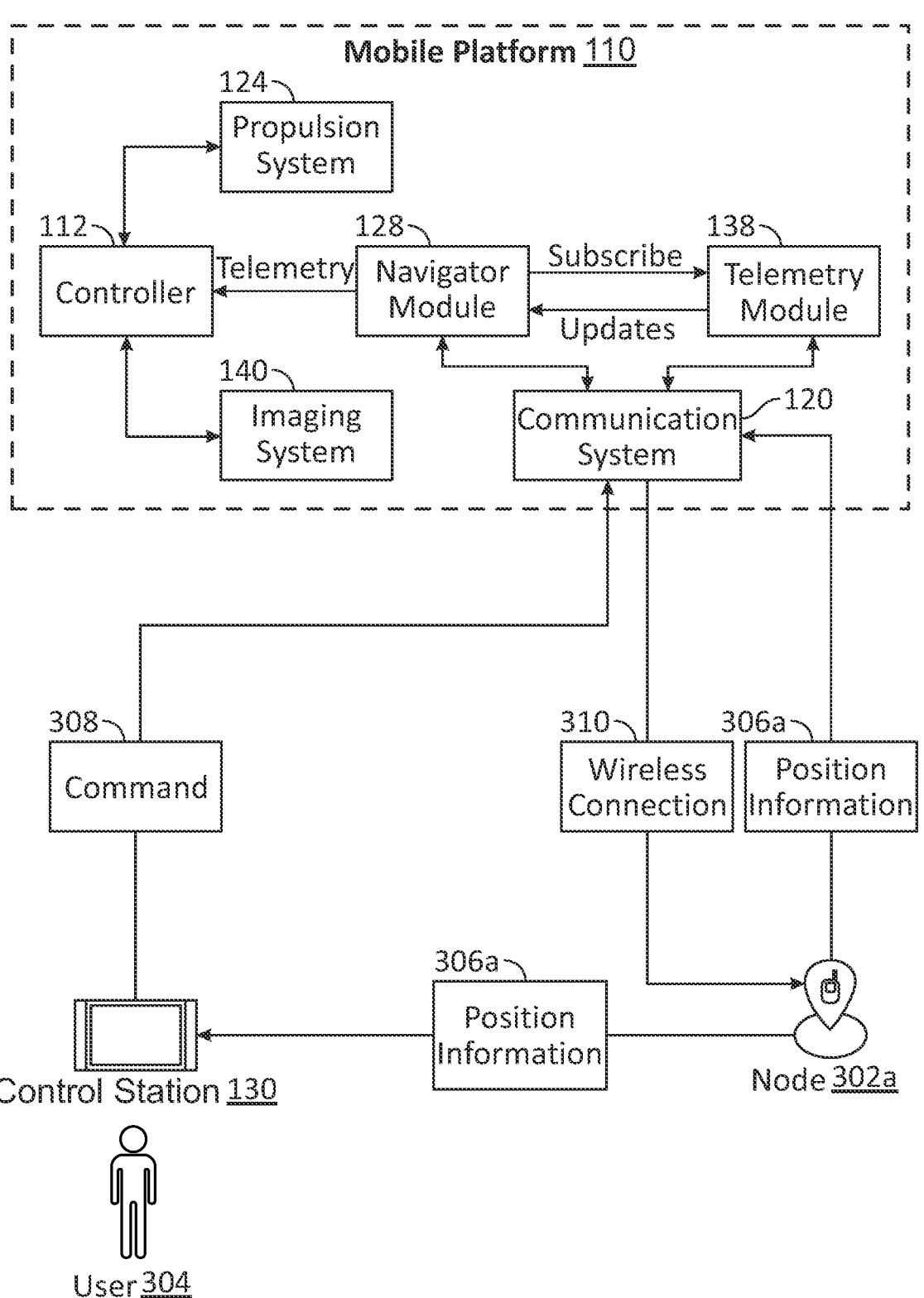
FIG. 3B illustrates a wireless connection between a node in the mesh network of FIG. 3A and a mobile platform in accordance with one or more embodiments of the disclosure.

As shown in FIG. 3B, communication system 120 of mobile platform 110 may receive command 308 from control station 130. In some embodiments, command 308 may identify a selected node (e.g., node 302a). Communication system 120 may communicate command 308 to navigator module 128. Navigator module 128 may be configured to receive command 308 from control station 130 by communication system 120. In response to receiving command 308, navigator module 128 may send a control signal to telemetry module 138 to subscribe to position information corresponding to node 302a. Telemetry module 138 may be configured to establish a wireless connection 310 between communication system 120 and node 302a in response to the control signal sent after command 308 was received. Once wireless connection 310 has been established, telemetry module 138 may receive broadcasted position information 306a from node 302a through wireless connection 310 and communication system 120. Telemetry module 138 may provide, to navigator module 128, position information 306a received from node 302a. For example, telemetry module 138 may post periodic (e.g., by the second) or non-periodic updates to navigator module 128 related to the position information received from node 302a.

Based on command 308 and the position information 306a updates provided by telemetry module 138, navigator module 128 may generate a control signal configured to cause mobile platform 110 to operate in accordance with command 308 and based on position information 306a. Navigator module 128 may provide the control signal to controller 112, and controller 112 may receive the control signal. Controller 112 may be configured to operate one or more elements of mobile platform 110 in accordance with command 308 and based on position information 306a.

In various embodiment, command 308 may correspond to a navigation command instructing the mobile platform to follow node 302a using position information 306a. In entering command 308, user 304 may indicate an offset distance defining a distance that mobile platform 110 should be separated from node 302a when mobile platform 110 is following node 302a. As an illustration, in such cases, node 302a may be another mobile platform. As another illustration, node 302a may be a radio device coupled to a vehicle. Controller 112 may operate propulsion system 124 to adjust a position of mobile platform 110 such that mobile platform 110 follows node 302a by the offset distance.

In some embodiments, control station 130 may send additional commands to mobile platform 110. For example, an additional command may be a second navigation command instructing mobile platform 110 to follow a second node using second position information corresponding to the second node and by a second offset distance. In response to receiving the second navigation command, the navigator module 128 may subscribe to the second position information, and telemetry module 138 may establish a second wireless connection between the communication system 120 and the second node. Telemetry module 138 may receive the second position information from the second node by the second wireless connection and provide the second position information to navigator module 128. Navigator module 128 may provide a second control signal to controller 112 to direct controller 112 to operate propulsion system 124 such that mobile platform 110 follows the second node by the second offset distance. In some embodiments, navigator module 128 may unsubscribe to the position information received from the prior node (e.g., node 302a), and telemetry module 138 may disconnect the wireless connection 310. However, in some cases, the navigator module 128 may remain subscribed to the prior node and the wireless connection 310 may be maintained, such as to execute other commands on the prior node or further monitor the prior node's position.

According to various embodiments, command 308 may be an image tracking command instructing mobile platform 110 to capture one or more images frames of node 302a. In such cases where command 308 is an image tracking command, controller 112 may operate propulsion system 124 and imaging system 140 (e.g., via gimbal system 122) of mobile platform 110 in accordance with the image tracking command and based on position information 306a. For example, navigator module 128 may receive position information 306a and generate a control signal based on position information 306a and a position/orientation of mobile platform 110 to provide to controller 112 such that controller 112 may operate propulsion system 124 and imaging system 140 to adjust a position and/or orientation of mobile platform 110 and a position and/or orientation of imaging system 140 such that image system 140 can capture one or more image frames of node 302a.

In certain embodiments, command 308 may be a landing command instructing mobile platform 110 to land at a landing location associated with node 302a. In such cases where command 308 is a landing command, controller 112 may operate propulsion system 124 in accordance with the landing command and based on position information 306a. For example, navigator module 128 may receive position information 306a and generate a control signal based on position information 306a and a current position/orientation of mobile platform 110. Navigator module 128 may provide the control signal to controller 112 to cause controller 112 to operate propulsion system 124 to steer mobile platform 110 to the landing location and land mobile platform 110 on the landing location.

Figure 3C:
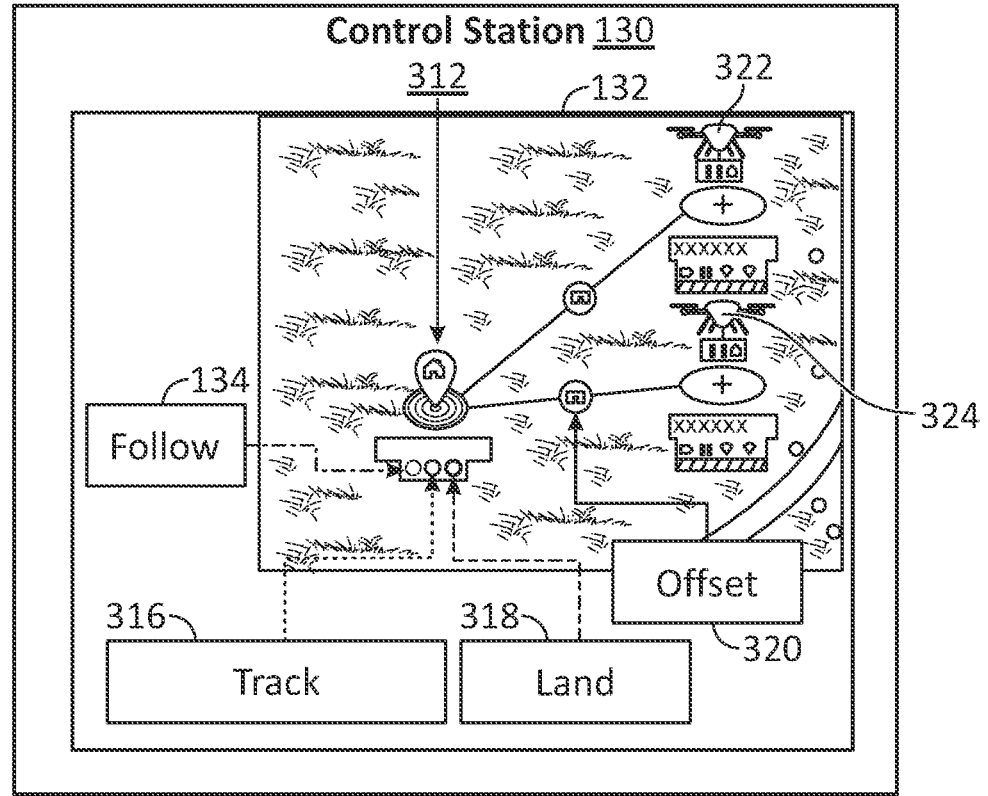
FIG. 3C illustrates a user interface of a control system in accordance with one or more embodiments of the disclosure.

FIG. 3C illustrates user interface 132 of control system 130 in accordance with one or more embodiments of the disclosure. User interface 132 may provide various user interface elements that a user may interact with to operate mobile platform 110. For example, user interface 132 may present nodes of a mesh network to a user using position information received by control system 130 from the nodes. For example, as shown in FIG. 3C, an element 312 provided in user interface 132 may represent a node in a mesh network (e.g., node 302a).

In some embodiments, the user may select nodes in the user interface and enter commands to send to mobile platform 110 to interact with the selected nodes. For example, an element 314 may be configured to allow the user to enter a navigation command (e.g., follow node 302a). An element 316 may be configured to allow the user to enter an image tracking command (e.g., track node 302a). An element 318 may be configured to allow the user to enter a land command (e.g., land at landing location associated with node 302a). An element 320 may be configured to allow the user to adjust (e.g., via a sliding scale or number entry) an offset distance by which mobile platform 110 will be separated from a selected node when following the node or image tracking the node.

Elements 322 and 324 may correspond to available mobile platforms that can receive commands from control station 130. For example, element 324 may represent mobile platform 110. The user may select element 324 and enter commands and offset distances where appropriate, and the commands may be sent from control station 130 to mobile platform 110 (e.g., via communication systems 120 and 134). As further discussed below, the command may cause the mobile platform 110 to establish a wireless connection to the selected node, subscribe to position information corresponding to the selected node and received from the selected node via the wireless connection, and operate the mobile platform in accordance with the command and in response to the position information of the selected node.

Figure 4A:
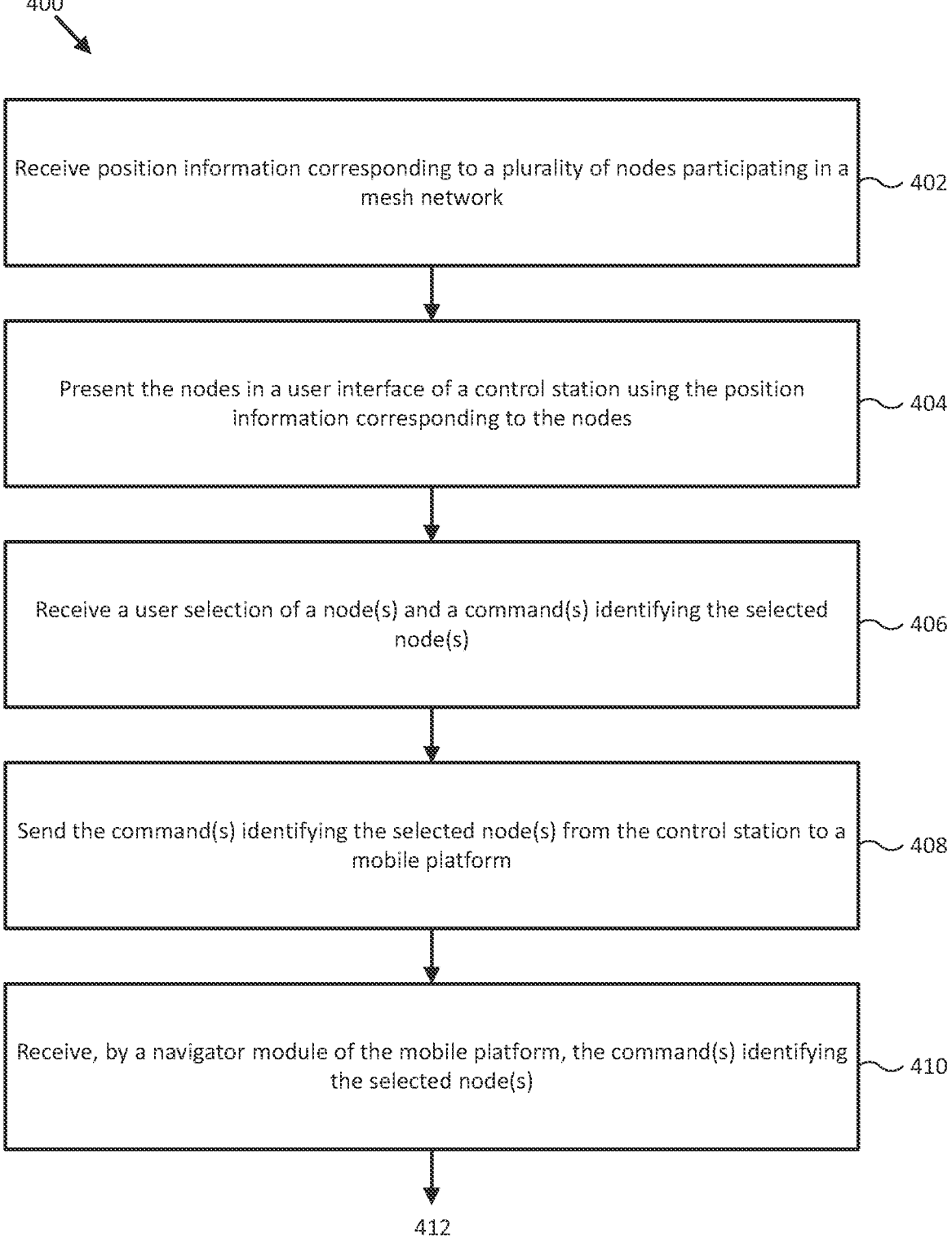
Figure 4C:
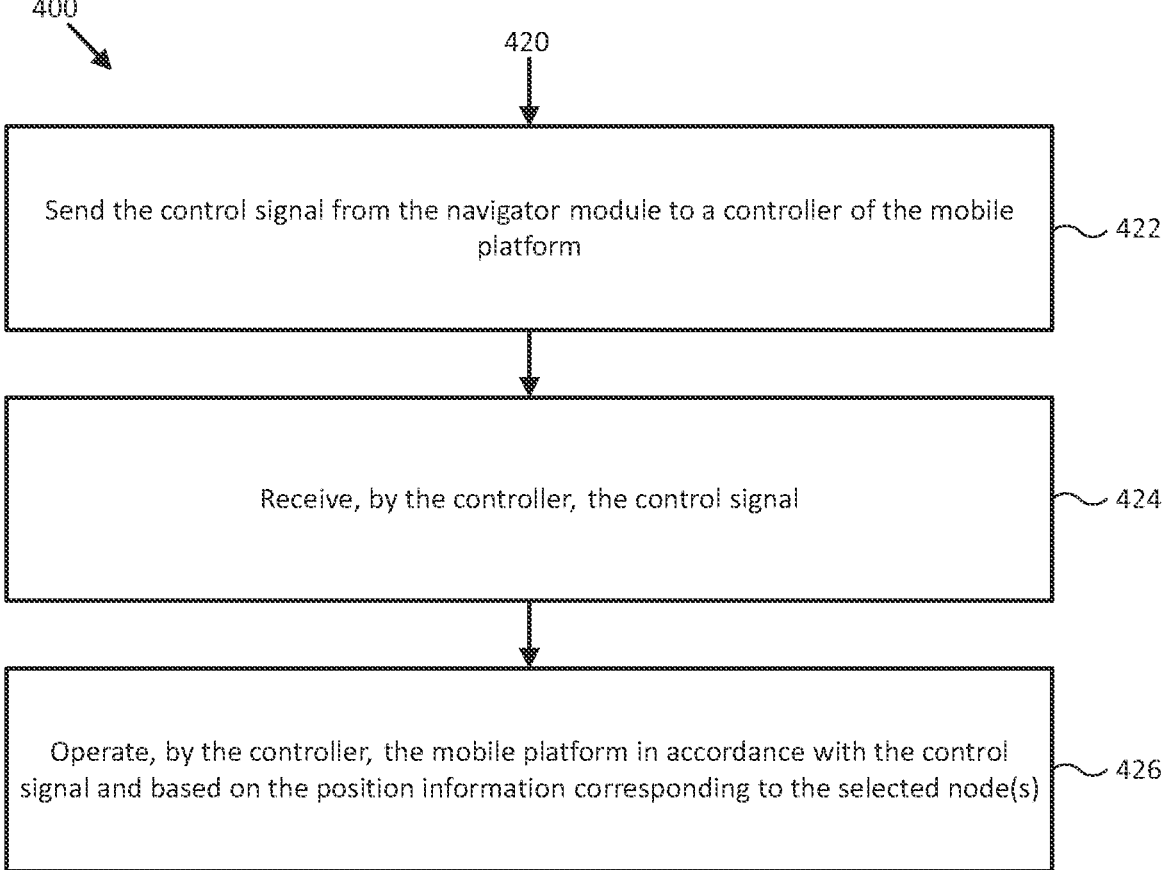

FIGS. 4A-4C illustrate a flow diagram of a process 400 for operating mobile platform 110 in accordance with one or more embodiments of the disclosure. In some embodiments, process 400 of FIGS. 4A-4C may be implemented as software instructions executed by one or more logic circuits associated with corresponding electronic devices, sensors, and/or structures depicted in FIGS. 1-3C. More generally, the operations of FIGS. 4A-4C may be implemented with any combination of software instructions, mechanical elements, and/or electronic hardware (e.g., inductors, capacitors, amplifiers, actuators, or other analog and/or digital components). It should also be appreciated that any step, sub-step, sub-process, or block of process 400 may be performed in an order or arrangement different from the embodiments illustrated by FIGS. 4A-4C. For example, in some embodiments, one or more blocks may be omitted from or added to process 400. Furthermore, block inputs, block outputs, various sensor signals, sensor information, calibration parameters, and/or other operational parameters may be stored to one or more memories prior to moving to a following portion of a corresponding process. Note that in describing FIGS. 4A-4C, reference is made to FIGS. 1-3C, however, it will be appreciated that embodiments of FIGS. 4A-4C are not limited by FIGS. 1-3C.

At block 402, control station 130 may receive position information corresponding to a plurality of nodes participating in a mesh network. For example, the nodes may use telemetry to determine their respective positions. In some embodiments, the nodes may send their respective position information using a Cursor-on-Target communication protocol. For example, nodes may send information that identifies the sending node, a current position information of the sending node, and when the information was sent from the sending node. In one embodiment, position information for nodes may include a GPS coordinate position (e.g., latitude, longitude, altitude, and/or time). In another embodiment, position information may include position information that indicates distance(s) relative to other nodes in the mesh network.

At block 404, control station 130 may present the nodes in user interface 132 using the position information corresponding to the nodes, as discussed in reference to FIG. 3C. At block 406, control station 130 receives a node selection (or node selections) and a command (or commands) in user interface 132 from a user 304 associated with control station 130. For illustrative purposes, reference below is made to node 302a as the selected node and command 308 as the inputted command, however, it will be appreciated that one or more other nodes in the mesh network may be selected and one or more other commands may be provided as input in the user interface 132.

At block 408, the node selection and the command are sent from control station 130 to mobile platform 110. For example, communication system 134 of control station 130 may transmit, to communication system 120 of mobile platform 110, a signal that has encoded therein the command 308, which includes an identification of the selected node, node 302a.

At block 410, navigator module 128 of mobile platform 110 receives command 308 by the communication system 120. In some embodiments, command 308 may be decoded by navigator module 128. At block 412, in response to command 308 and the identified selected node 302a, navigator module 128 may subscribe to position information 306a corresponding to the selected node 302a. For example, navigator module 128 may instruct telemetry module 138 to receive position information 306a from node 302a and provide periodic updates of the position information 306a of node 302a back to navigator module 128. In some embodiments, prior to subscribing to the position information 306a corresponding to the selected node 302a, telemetry module 138 may have filtered out radio waves broadcasted by node 302a or may have disregarded a frequency channel in which node 302a was broadcasting its position information 306a.

At block 414, telemetry module 138 of mobile platform 110 may establish a wireless connection 310 with the selected node 302a. For example, telemetry module 138 may direct communication system 120 to begin receiving the position information 306a from node 302a. In some cases, this may mean directing the communication system 120 to pass (e.g., stop filtering) the broadcasted position information 306a from node 302a to telemetry module 138. In some embodiments, command 308 may identify the selected node 302a and include information to allow telemetry module 138 to receive the position information 306a from node 302a. For example, control station 130 may include decryption instructions that allow telemetry module 138 to begin receiving the position information 306a from node 302a and decrypting the position information 306a so that it may be used in controlling mobile platform 110 to interact with node 302a according to command 308.

At block 416, telemetry module 138 receives position information 306a corresponding to the selected node 302a. For example, telemetry module 138 may receive the position information 306a by communication system 120. In various embodiments, telemetry module 138 may continue to receive the position information 306a from node 302a for the duration that navigator module 128 is subscribed to the position information 306a of node 302a. In some embodiments, navigator module 128 may be subscribed to the position information 306a of node 302a until the tasks associated with command 308 have been completed. In some embodiments, navigator module 128 may be subscribed to the position information 306a of node 302a until a superseding command or override instructions (e.g., manual steering by user 304) are received from control station 130. For example, if mobile platform 110 was commanded to follow node 302a, but received a subsequent command to follow node 302b, navigator module 128 may unsubscribe from position information 306a of node 302a and telemetry module may disconnect wireless connection 310. Then, navigator module 128 may subscribe to position information 306b of node 302b and a new wireless connection may be established between node 302b and telemetry module via communication system 120. However, unsubscribing and disconnecting from prior nodes may not be necessary in all cases, as mobile platform 110 may need to continue to monitor a position of the prior node (e.g., node 302a) that it was following (e.g., for image tracking, positional awareness, data routing in the mesh network, etc.).

At block 418, telemetry module 138 may provide, to the navigator module 128, the position information 306a received from the selected node(s) (e.g., node 302a). For example, the position information 306a may be provided to navigator module 128 as an analog or digital signal. At block 420, navigator module 128 may translate the position information 306a provided by telemetry module 138 into a control signal for controller 112 of mobile platform 110. For example, navigator module 128 may determine how the mobile platform 110 should be operated based on its own position and orientation and the position information 306a corresponding to node 302a. The control signal may be generated by navigator module 128 to control controller 112 to operate mobile platform 110 such that command 308 can be completed. The control signal provided to controller 112 may be continuously updated to adjust mobile platform 110 based on the position information 306a that is being received from node 302a.

As an illustration of the control signal provided to controller 112, assume a case in which node 302a is another mobile platform and command 308 is a navigation command to follow node 302a. Node 302a may be flying in a direction away from mobile platform 110. Based on the position information 306a that is being received from node 302a, a position of mobile platform 110 will have to be adjusted so that it can follow node 302a. For example, using the position information 306a of node 302a and an offset distance associated with the command to follow node 302a, navigator module 128 may determine a position to where mobile platform 110 should move, to be in accordance with the command to follow node 302a.

As another illustration of the control signal provided to controller 112, assume a case in which node 302a is a base station (e.g., a stationary base station, a moving aircraft, or vehicle base station) having an associated landing location. Using the position information 306a received from node 302a, the mobile platform 110 may navigate toward node 302a. Once mobile platform 110 is within a certain proximity to node 302a and the landing location, it may land using one of various techniques. For example, the landing location associated with node 302a relative to the position information 306a provided by node 302a may be known and used by navigator module 128 to generate a control signal for controller 112 that would steer mobile platform 110 to the landing location. In some cases, controller 112 may control imaging system 140 to capture image frames of the landing location to assist navigator module 128 in steering mobile platform 110 to the landing location and landing mobile platform 110 on the landing location. Using imaging system 140 may assist when node 302a is moving and mobile platform 110 attempts to land on the landing location associated with node 302a while it is moving.

As another illustration of the control signal provided to controller 112, assume a case in which command 308 is an image tracking command instructing mobile platform 110 to track node 302a using imaging system 140 of mobile platform 110. Using the position information 306a received from node 302a, the mobile platform 110 may position and orient itself to capture image frames of node 302a. Based on the position information 306a that is being received from node 302a, a position of mobile platform 110 may have to be adjusted so that it is within range of node 302a to capture the image frames with sufficient detail. In some cases, the image tracking command may include an offset or desired distance that the mobile platform 110 should be from node 302a when capturing the image frames. Further based on the position information 306a that is being received from node 302a, an orientation of mobile platform 110 and/or imaging system 140 (e.g., via gimbal 122) may have to be adjusted to capture image frames of node 302a. Navigator module 128 may determine a position to where mobile platform 110 should move, to be in accordance with the command to image track node 302a. Navigator module 128 (and/or logic circuit 154, which may include navigator module 128) may determine what adjustments are required to the orientation of mobile platform 110 and/or imaging system 140 so that the image frames of node 302a may be captured. The control signal may be generated by navigator module 128 (and/or logic circuit 154) based on the required adjustments to the position of mobile platform 110 and the orientation of mobile platform 110 and/or imaging system 140.

At block 422, navigator module 128 may send the control signal to controller 112. In some embodiments, the control signal may be sent by logic circuit 154 to controller 112. In further embodiments, navigator module 128 may be implemented in logic circuit 154. At block 424, controller 112 may receive the control signal. At block 426, controller 112 may operate mobile platform 110 in accordance with the control signal and based on the position information 306a corresponding to node 302a. (e.g., the control signal sent to controller 112 may be continuously adjusted based on the position information 306a received from node 302a so that the mobile platform 110 can adjust its position/orientation relative to node 302a to execute command 308). For example, when mobile platform 110 receives a navigation command to follow node 302a or image track node 302a, controller 112 may operate propulsion system 125 and/or imaging system 140 based on the control signal to move mobile platform 110 to a position relative to node 302a that allows mobile platform 110 to follow node 302a and/or capture image frames of node 302a. As another example, when mobile platform 110 receives a landing command to land at a landing location associated with node 302a, controller 112 may operate propulsion system 125 and/or imaging system 140, based on the control signal, to land mobile platform 110 at the landing location.

Thus, embodiments of the present disclosure improve the operational flexibility of mobile platforms. For example, the present disclosure provides a user with the ability to designate a node in a mesh network as a follow target. Moreover, the user may dynamically swap follow targets from one node to another node in the mesh network. For example, a mobile platform may be commanded to follow a first node that is another mobile platform, then the mobile platform can be commanded to follow a second node that is a radio device held by a human. A control station may conveniently provide a user interface that identifies the different nodes and their types and allows the user manage commandment of the mobile platform. Embodiments of the present disclosure further allow a mobile platform to be commanded to follow other autonomous vehicles, including air, ground, or water vehicles that are participating in the mesh network. In some cases, a plurality of mobile platforms and autonomous or semi-autonomous platforms (e.g., vehicles) may be daisy chained together such that platforms in the chain have a target to follow and a leading platform can lead the chain to a desired location.

It will further be appreciated that prior to the present disclosure, a mobile platform such as a UAV could follow a base station only using an internal radio connection. However, the present disclosure provides embodiments in which a UAV may follow any radio marker that is part of a mesh network and provides position information (e.g., GPS coordinates) by utilizing internal or external radio connections.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A control station comprising:
a communication system configured to pass wireless signals between the control station and a mesh network comprising a plurality of nodes;
a user interface; and
a logic circuit configured to:
 receive, from each of the plurality of nodes via the communication system, position information corresponding to the node using a Cursor-on-Target (CoT) communication protocol,
 present a representation of the nodes in the user interface using the position information corresponding to the plurality of nodes, wherein the representation includes a view of each of the plurality of nodes and a respective position in relation to a position of a mobile platform as part of a geographical map,
 receive, using the user interface, a user selection of a node from the plurality of nodes,
 send to the mobile platform, by the communication system, a command identifying the selected node;
 wherein the command causes the mobile platform to establish a wireless connection to the selected node, receive position information corresponding to the selected node from the selected node by the wireless connection, and operate a propulsion system of the mobile platform in response to the position information of the selected node.

2. The control station of claim 1, wherein the command is a navigation command instructing the mobile platform to follow the selected node using the position information corresponding to the selected node with an offset distance.

3. The control station of claim 2, wherein the plurality of nodes comprises mobile nodes, wherein the selected node is another mobile platform.

4. The control station of claim 2, wherein:
the navigation command is a first navigation command, the user selection is a first user selection, the selected node is a first node, the position information corresponding to the selected node is first position information, and the offset is a first offset; and
the logic circuit is configured to:
 receive a second user selection of a second node from the plurality of nodes,
 send to the mobile platform, by the communication system, a second navigation command identifying the second selected node, and
 wherein the second navigation command causes the mobile platform to establish a second wireless connection to the second node, receive second position information corresponding to the second node from the second node by the second wireless connection, and operate the propulsion system so that the mobile platform switches to following the second node using the second position information with a second offset distance.

5. The control station of claim 4, wherein the logic circuit is further configured to send to the mobile platform a superseding command that causes the mobile platform to dynamically swap between following the first node and following the second node.

6. The control station of claim 1, wherein:
the command is an image tracking command; and
the image tracking command causes the mobile platform to orient a camera of an imaging system of the mobile platform based on the position information corresponding to the selected node to capture an image of the selected node.

7. The control station of claim 1, wherein:
the selected node is a landing location;
the command is a landing command; and
the landing command causes the mobile platform to operate the propulsion system to land the mobile platform at the landing location.

8. The control station of claim 1, wherein:
the mobile platform is an unmanned aerial vehicle; and
the position information corresponding to the nodes is global positioning system (GPS) information comprising locations of the nodes.

9. The control station of claim 1, wherein the control station is a tablet computing device and the user interface is a touchscreen configured to receive the user selection.

10. A method of operating the control station of claim 1, the method comprising:
receiving the position information corresponding to the nodes;
presenting the nodes in the user interface using their corresponding position information;
receiving the user selection of the node; and
sending the command to the mobile platform.

11. A mobile platform comprising:
a propulsion system configured to provide motive force for the mobile platform;
the communication system configured to pass wireless signals between the mobile platform and the mesh network;
a navigator module configured to receive, from the control station of claim 1 by the communication system, the command identifying the selected node from the plurality of nodes of the mesh network;
a telemetry module configured to establish the wireless connection between the communication system and the selected node in response to the command, wherein the telemetry module is configured to provide updated position information of the selected node to the navigator module;

wherein the navigator module is further configured to receive the position information corresponding to the selected node from the telemetry module, wherein the position information is received from the selected node by the wireless connection and provided to the navigator module by the telemetry module; and a controller configured to operate the propulsion system in response to the position information.

12. The mobile platform of claim 11, wherein the command is a navigation command instructing the mobile platform to follow the selected node using the position information with an offset distance.

13. The mobile platform of claim 12, wherein the plurality of nodes comprises mobile nodes, wherein the selected node is another mobile platform.

14. The mobile platform of claim 12, wherein:

the navigation command is a first navigation command, the selected node is a first node, the position information is first position information, and the offset is a first offset;

the navigator module is configured to:

receive, from the control station via the communication system, a second navigation command configured to select a second node from the plurality of nodes, the second navigation command instructing the mobile platform to follow the second node using second position information corresponding to the second node and with a second offset distance, and receive the second position information from the telemetry module, wherein the telemetry module is configured to establish a second wireless connection between the communication system and the second node in response to the second navigation command, the second position information is received from the second node by the second wireless connection and provided to the navigator module by the telemetry module; and the controller is configured to operate the propulsion system so that the mobile platform switches to following the second node using the second position information and with the second offset distance.

15. The mobile platform of claim 14, wherein the navigator module is further configured to receive a superseding command that causes the mobile platform to dynamically swap between following the first node and following the second node.

16. The mobile platform of claim 11, further comprising:

an imaging system comprising a camera;

wherein the command is an image tracking command; and wherein the imaging system is configured to orient the camera, based on the position information, to capture an image of the selected node.

17. The mobile platform of claim 11, wherein:

the selected node is a landing location;

the command is a landing command; and the controller is configured to operate the propulsion system to land the mobile platform at the landing location.

18. The mobile platform of claim 11, wherein:

the mobile platform is an unmanned aerial vehicle; and the position information corresponding to the nodes is global positioning system (GPS) information comprising locations of the nodes.

19. The mobile platform of claim 11, further comprising a logic circuit, wherein the logic circuit comprises the navigator module, the telemetry module, and/or the controller.

20. A method of operating the mobile platform of claim 11, the method comprising:

receiving the command by the navigator module;

establishing the wireless connection by the telemetry module;

subscribing to the position information by the navigator module;

receiving, by the telemetry module via the wireless connection, the position information from the selected node; and operating, by the controller, the propulsion system in response to the position information.

* * * * *